US009205793B2

(12) United States Patent
Iijima et al.

(10) Patent No.: US 9,205,793 B2
(45) Date of Patent: Dec. 8, 2015

(54) VEHICLE BODY STRUCTURE

(75) Inventors: Toshihide Iijima, Nagoya (JP); Naoya Sakaguchi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/116,937

(22) PCT Filed: May 8, 2012

(86) PCT No.: PCT/IB2012/000893
§ 371 (c)(1),
(2), (4) Date: Nov. 11, 2013

(87) PCT Pub. No.: WO2012/156794
PCT Pub. Date: Nov. 22, 2012

(65) Prior Publication Data
US 2014/0103670 A1    Apr. 17, 2014

(30) Foreign Application Priority Data

May 13, 2011 (JP) .................................. 2011-107907

(51) Int. Cl.
*B60R 19/34* (2006.01)
*B60R 19/24* (2006.01)
*B62D 21/15* (2006.01)

(52) U.S. Cl.
CPC ................. *B60R 19/34* (2013.01); *B60R 19/24* (2013.01); *B62D 21/152* (2013.01)

(58) Field of Classification Search
CPC ................... A47B 96/021; B65D 2543/00629; B65D 2543/00685; B65D 2543/00796; B65H 2701/32; H01L 2924/00; H01L 2924/00014; H01L 2224/48463; B41J 11/003; B41J 11/008
See application file for complete search history.

(56) References Cited

U.S. PATENT DOCUMENTS

| 7,077,442 | B2 * | 7/2006 | Arns ............................. 293/155 |
| 7,896,428 | B2 * | 3/2011 | Tamakoshi et al. ...... 296/187.03 |
| 8,807,632 | B2 * | 8/2014 | Ramoutar et al. ........ 296/187.09 |
| 9,010,845 | B1 * | 4/2015 | Ramoutar et al. ........ 296/187.09 |
| 2011/0012381 | A1 * | 1/2011 | Saito et al. ..................... 293/133 |
| 2014/0008924 | A1 * | 1/2014 | Han et al. ....................... 293/133 |
| 2014/0062106 | A1 * | 3/2014 | Han ................................ 293/133 |
| 2014/0062107 | A1 * | 3/2014 | Kim et al. ...................... 293/133 |
| 2014/0091585 | A1 * | 4/2014 | Ramoutar et al. ............ 293/133 |
| 2014/0319860 | A1 * | 10/2014 | Braunbeck et al. ........... 293/133 |
| 2014/0361560 | A1 * | 12/2014 | Sakakibara et al. .......... 293/133 |
| 2014/0361561 | A1 * | 12/2014 | Kuriyama et al. ............ 293/133 |
| 2015/0061307 | A1 * | 3/2015 | Nakanishi ..................... 293/133 |

FOREIGN PATENT DOCUMENTS

| JP | 60-124552 | 7/1985 |
| JP | 9-86309 | 3/1997 |
| JP | 2009-45948 | 3/2009 |

* cited by examiner

*Primary Examiner* — Kiran B Patel
(74) *Attorney, Agent, or Firm* — Oblon, McClelland, Maier & Neustadt, L.L.P.

(57) ABSTRACT

A vehicle body structure includes a bumper reinforcement, a front side member, and a bumper stay. The front side member is formed with a closed section portion, and a protruding portion that protrudes from this closed section portion toward a vehicle front side. The bumper stay, together with a protruding portion, forms an open section portion. Also, a notch is formed on the vehicle width direction inside of the closed section portion, and a cutout is formed on the vehicle width direction outside of the open section portion. Opposing wall portions that are fixed to protruding opposing portions and opposing wall portions that connect the cutout and the notch are formed on the bumper stay. These opposing wall portions are formed with extending edge portions that extend from the cutout side toward the notch side.

5 Claims, 5 Drawing Sheets

VEHICLE BODY STRUCTURE

BACKGROUND OF THE INVENTION

1. Field of the Invention

The invention relates to a vehicle body structure.

2. Description of Related Art

Japanese Patent Application Publication No. 60-124552 (JP 60-124552 A), for example, describes a bumper stay mounting structure that includes a bumper stay, and a front side member, a front end portion of which the bumper stay can be mounted to, and in which a plurality of beads are formed at intervals in the vehicle longitudinal direction on a corner portion of an upper wall and a vertical wall of this front end portion.

However, with this bumper stay mounting structure, it may be difficult to set differences in strength against a collision load for the portion where the plurality of beads are formed, due to restrictions of the sectional shape of the front side member or the like, for example. Also, in this case, when the vehicle is involved in a frontal collision, it is difficult to make the plurality of beads crush in order from the front side of the vehicle, so energy absorption efficiency may decrease.

SUMMARY OF THE INVENTION

Therefore, the invention provides a vehicle body structure capable of ensuring energy absorption efficiency when a vehicle is involved in a collision.

A first aspect of the invention relates to a vehicle body structure that includes a bumper reinforcement that is arranged on an end portion of a vehicle body in a vehicle longitudinal direction so that a longitudinal direction of the bumper reinforcement is set along a vehicle width direction: a side member that is arranged, at a vehicle width direction outside portion of the bumper reinforcement, on a vehicle longitudinal direction cabin side with respect to the bumper reinforcement so that a longitudinal direction of the side member is set along the vehicle longitudinal direction, and that is formed with i) a closed section portion of which a cross section when the closed section portion is cut along the vehicle width direction forms a closed section, and ii) a protruding portion that protrudes from the closed section portion toward the bumper reinforcement side; a bumper stay that connects the side member to the bumper reinforcement, and that forms, together with the protruding portion, an open section portion of which a cross section when the open section portion is cut along the vehicle width direction forms an open section; a first weak portion formed on one side in the vehicle width direction of the closed section portion; and a second weak portion formed on the other side in the vehicle width direction of the open section portion. A connecting wall portion that connects the first weak portion with the second weak portion is formed on the side member, and a load transmitting portion that is fixed to the connecting wall portion and that is formed with an extending edge portion that extends from the second weak portion side toward the first weak portion side is formed on the bumper stay.

With this vehicle body structure, the first weak portion is formed on one side in the vehicle width direction of the closed section portion that is formed on the side member, and the second weak portion is formed on the other side in the vehicle width direction of the open section portion that is formed by the bumper stay and the protruding portion of the side member. Therefore, in the initial stage of a collision when a collision load is input to the bumper reinforcement, for example, deformation occurs in the second weak portion formed on the open section portion that is weaker against the collision load than the closed section portion is.

Also, the load transmitting portion that is fixed to the connecting wall portion that connects the first weak portion with the second weak portion is formed on the bumper stay, and this load transmitting portion is formed having the extending edge portion that extends from the second weak portion side toward the first weak portion side. Therefore, in a stage after the initial stage of a collision described above, the collision load is transmitted to the extending edge portion, such that deformation that has occurred in the second weak portion described above progresses along the extending edge portion to the first weak portion side. Thus, this deformation spreads to the first weak portion. As a result, the first weak portion deforms, and this deformation of the first weak portion triggers compression deformation in the vehicle longitudinal direction at a portion of the side member where the first weak portion is formed.

In this way, according to this vehicle body structure, when a collision load is input to the bumper reinforcement, the side member compression deforms stably in the vehicle longitudinal direction at the portion where the first weak portion is formed, so the energy absorption efficiency when the vehicle is involved in a collision can be ensured.

In the vehicle body structure described above, a first edge portion that extends toward the bumper reinforcement side and the one side in the vehicle width direction may be formed on the protruding portion, and a second edge portion that is positioned on the bumper reinforcement side of the first edge portion, that extends from the extending edge portion toward the bumper reinforcement side and the other side in the vehicle width direction, and that intersects with the first edge portion in a plan view, may be formed on the bumper stay. Also, the second weak portion may be a cutout portion that is formed by the first edge portion and the second edge portion, and that is open to the other side in the vehicle width direction.

According to this vehicle body structure, the cutout portion is formed by the first edge portion formed on the protruding portion, and the second edge portion formed continuous with the extending edge portion on the bumper stay, and this cutout portion serves as the second weak portion. Therefore, the second weak portion can be formed by a simple structure, so the energy absorption efficiency can be efficiently ensured.

In the vehicle body structure described above, the first weak portion, the second weak portion, and the load transmitting portion may each be formed at portions on both sides in a vehicle vertical direction.

According to this vehicle body structure, the first weak portion is formed at each end of the closed section portion in the vehicle vertical direction, the second weak portion is formed at each end of the open section portion in the vehicle vertical direction, and the load transmitting portion is formed at each end of the bumper stay in the vehicle vertical direction. Therefore, when a collision load is input to the bumper reinforcement, the side member is able to be made to compression deform in a well-balanced manner on both sides in the vehicle vertical direction.

In the vehicle body structure described above, a concave portion (i.e., a bead) that extends in the vehicle vertical direction and that is indented toward the other side in the vehicle width direction may be formed on the one side in the vehicle width direction of the closed section portion, and on the cabin side of the first weak portion, in the side member.

According to this vehicle body structure, the side member first compression deforms in the vehicle longitudinal direction at the portion where the first weak portion is formed, and then further compression deforms at a portion where the bead that is positioned on the cabin side of the first weak portion is formed. As a result, the energy absorption efficiency is able to be increased even more.

In the vehicle body structure described above, the load transmitting portion may be joined to the connecting wall portion along the extending edge portion.

Also, in the vehicle body structure described above, the load transmitting portion may be joined to the connecting wall portion by a plurality of welds lined up along the extending edge portion.

According to this vehicle body structure, the load transmitting portion is fixed (joined) to the connecting wall portion (by welds) along the extending edge portion, so in a stage after the initial stage of a collision described above, the collision load is able to be transmitted even more efficiently to the extending edge portion.

As described in detail above, according to the foregoing aspect and structures of the invention, when a collision load is input to the bumper reinforcement, the side member compression deforms stably in the vehicle longitudinal direction at the portion where the first weak portion is formed, so the energy absorption efficiency when the vehicle is involved in a collision can be ensured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
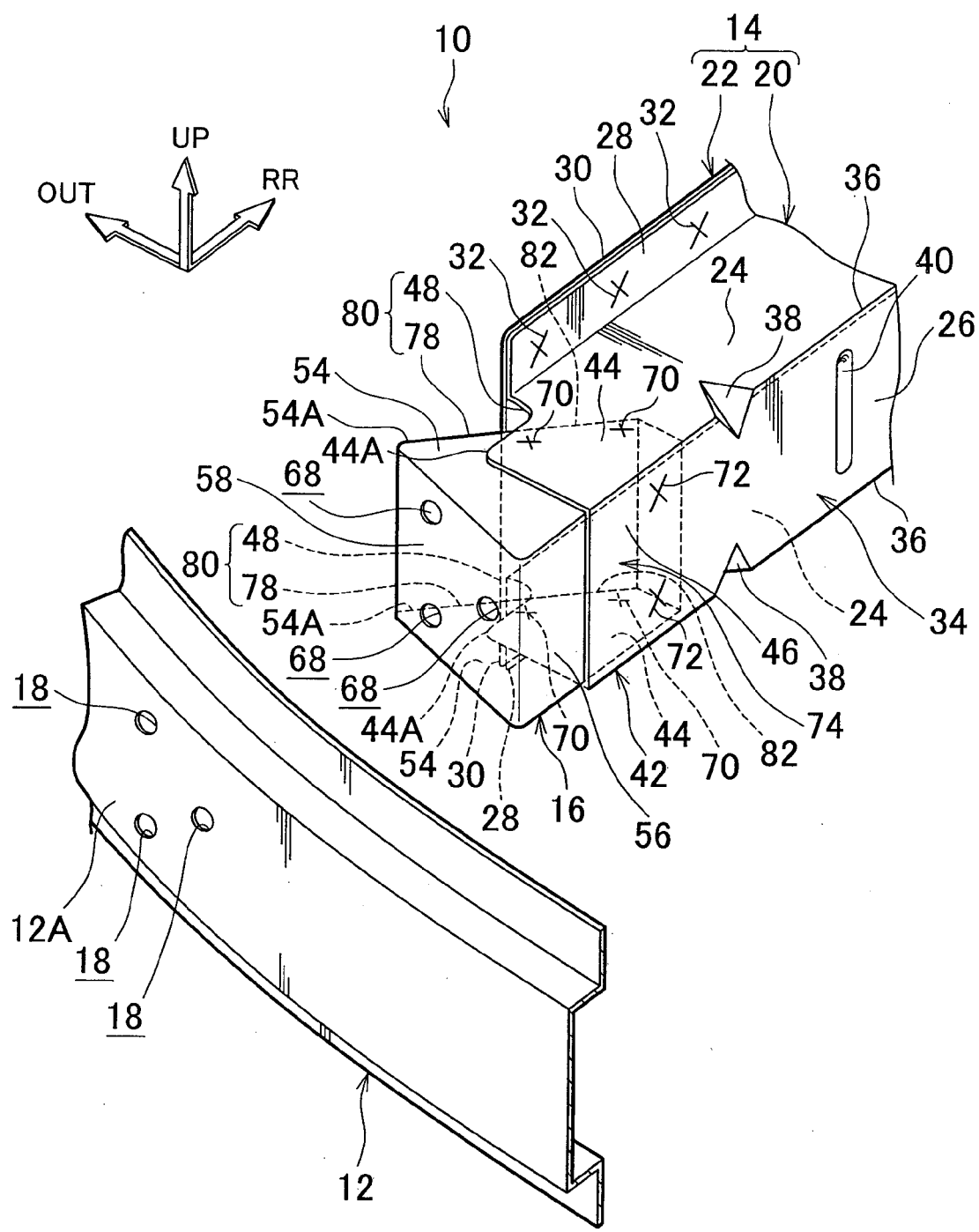
FIG. 1 is an exploded perspective view of a vehicle body structure according to an example embodiment of the invention.

Hereinafter, an example embodiment of the invention will be described with reference to the accompanying drawings.

Arrows UP, RR, and OUT in the drawings indicate an upward side in the vehicle vertical direction, a rear side in the vehicle longitudinal direction, and an outside direction in the vehicle width direction (i.e., the right side when viewed from the front of the vehicle), respectively.

As shown in FIG. 1, a vehicle body structure 10 according to the example embodiment of the invention includes a bumper reinforcement 12, a front side member 14 that serves as the side member of the invention, and a bumper stay 16.

The bumper reinforcement 12 is formed in a long shape with the vehicle width direction being the longitudinal direction, and is arranged on a front portion of a vehicle body (i.e., an end portion in the vehicle longitudinal direction of the vehicle body). A plurality of mounting holes 18 that pass through in the vehicle longitudinal direction are formed in a vehicle width direction outside portion 12A of the bumper reinforcement 12. The plurality of mounting holes 18 are provided in greater number on the vehicle width direction outside (i.e., the side with a cutout portion 80 that will be described later) than on the vehicle width direction inside (here as an example, one is provided on the vehicle width direction inside, and two are provided on the vehicle width direction outside).

The front side member 14 is formed in a long shape with the vehicle longitudinal direction being the longitudinal direction, and is arranged on a cabin side (i.e., the vehicle rear side) of the vehicle width direction outside portion 12A of the bumper reinforcement 12. This front side member 14 has a side member inner 20 and a side member outer 22.

The side member inner 20 is formed symmetrical in the vehicle vertical direction. This side member inner 20 has a pair of opposing wall portions 24 that extend in the vehicle width direction and the vehicle longitudinal direction and oppose one another in the vehicle vertical direction, and an inside wall portion 26 that connects end portions, on the vehicle width direction inside, of this pair of opposing wall portions 24 together. A flange 28 that extends in the vehicle vertical direction and the vehicle longitudinal direction is formed on end portions in the vehicle width direction outside of the opposing wall portions 24.

The side member outer 22 is arranged on the vehicle width direction outside of the side member inner 20, and is formed in a flat plate shape that extends in the vehicle vertical direction and the vehicle longitudinal direction. The end portion on both sides in the vehicle vertical direction of this side member outer 22 is formed as a flange 30. This flange 30 is joined to the flange 28 described above by a plurality of welds 32 that are produced by spot welding and lined up at intervals in the vehicle longitudinal direction.

Also, a closed section portion 34 of which a cross section cut along the vehicle width direction forms a closed section is formed by the pair of opposing wall portions 24, the inside wall portion 26, and the side member outer 22, when the side member outer 22 is assembled to the side member inner 20 in this way.

Also, notches 38 with a V-shaped cross section are formed through ridge line portions 36 (i.e., tips of corner portions) that connect the opposing wall portions 24 and the inside wall portion 26 together, in portions on the vehicle width direction inside (i.e., on one side in the vehicle width direction) of this closed section portion 34, i.e., in corner portions formed by the opposing wall portions 24 and the inside wall portion 26. These notches 38 correspond to the first weak portion of the invention, and are positioned on a tip end side (i.e., the vehicle front side) of the closed section portion 34.

Also, a bead (i.e., a concave portion) 40 that is indented toward the vehicle width direction outside is formed to the vehicle rear side of the notches 38 in the inside wall portion 26. This bead 40 extends in the vehicle vertical direction, and end portions on both sides in the vehicle vertical direction thereof end (i.e., terminate) between the pair of ridge line portions 36 (i.e., before reaching the ridge lines) in the vehicle vertical direction.

A protruding portion 42 that protrudes out toward the vehicle front side (i.e., the bumper reinforcement 12 side) from the closed section portion 34 described above is formed on the side member inner 20. This protruding portion 42 is formed having a pair of protruding opposing portions 44 that are formed continuous with the opposing wall portions 24 and face each other, and a protruding connecting portion 46 that is formed continuous with the inside wall portion 26 and that connects end portions on the vehicle width direction inside of the pair of protruding opposing portions 44 together.

Moreover, portions on the vehicle rear side of edge portions 44A on the vehicle width direction outside of the protruding opposing portions 44 are formed as first edge portions

Figure 2:
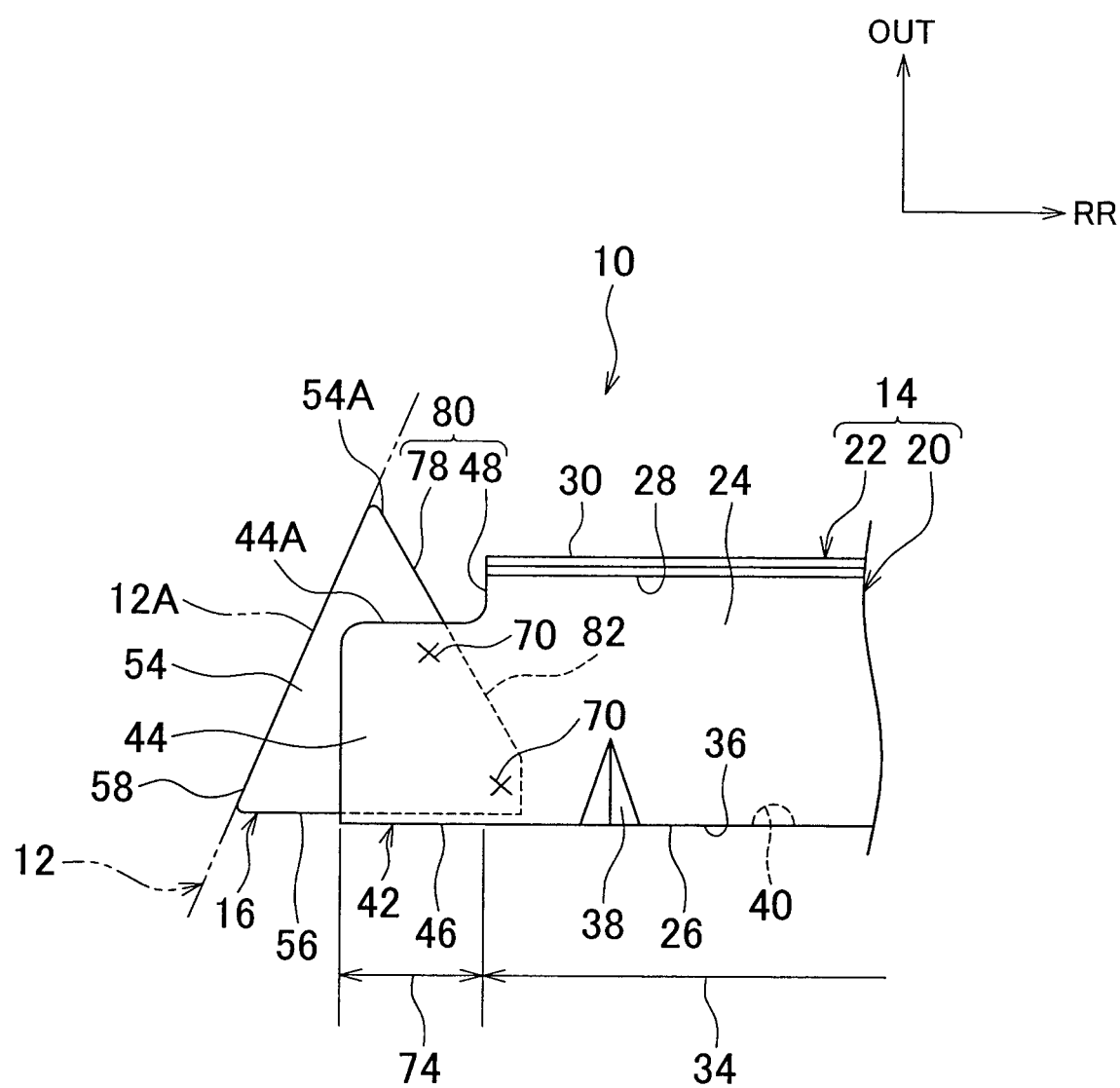
FIG. 2 is a plan view of the vehicle body structure shown in FIG. 1.

48. These first edge portions 48 are formed in an arc shape that forms a protrusion on the vehicle rear side and the vehicle width direction inside in a plan view, and extend toward the vehicle front side and the vehicle width direction inside (i.e., the bumper reinforcement 12 side and one side in the vehicle width direction) (also see FIG. 2).

The bumper stay 16 is arranged between the front side member 14 and the bumper reinforcement 12. This bumper stay 16 includes a pair of opposing wall portions 54 that extend in the vehicle width direction and the vehicle longitudinal direction and face each other in the vehicle vertical direction, an inside wall portion 56 that connects end portions on the vehicle width direction inside of the pair of opposing wall portions 54 together, and a front wall portion 58 that connects end portions on the vehicle front side of the pair of opposing wall portions 54 and the inside wall portion 56 together.

A plurality of mounting holes 68 that pass through in the vehicle longitudinal direction are formed in positions matching the plurality of mounting holes 18 described above, in the front wall portion 58. The bumper reinforcement 12 is then fixed to the bumper stay 16 by bolts, not shown, being inserted through the plurality of mounting holes 18 and 68, and nuts, also not shown, being screwed onto the tip end portions of these bolts.

Also, a portion on the vehicle rear side of this bumper stay 16 is inserted inside the front side member 14, and the opposing wall portions 54 are joined by a plurality of welds 70 produced by spot welding to the opposing wall portions 24 and the protruding opposing portions 44. The plurality of welds 70 are lined up along extending edge portions 82 that will be described later formed on the opposing wall portions 54. Also, the inside wall portion 56 is joined to the inside wall portion 26 by a plurality of welds 72 produced by spot welding.

Also, an open section portion 74 of which a cross section cut along the vehicle width direction forms an open section is formed by the bumper stay 16 and the protruding portion 42, when the bumper stay 16 is assembled to the protruding portion 42 in this way.

Also, edge portions 54A on the vehicle width direction outside, of the opposing wall portions 54 are inclined, with respect to the vehicle longitudinal direction, toward the vehicle width direction inside farther toward the vehicle rear side. Portions of these edge portions 54A that are positioned on the vehicle front side (i.e., the bumper reinforcement 12 side) of the first edge portions 48 described above are formed as second edge portions 78, and these second edge portions 78 intersect with the first edge portions 48 in a plan view (see FIG. 2). The welds 70 on the vehicle front side, from among the plurality of welds 70 described above, are provided near the positions where the first edge portions 48 intersect with the second edge portions 78 (see FIGS. 1 and 2).

Also, cutout portions 80 that are open to the vehicle width direction outside (i.e., the other side in the vehicle width direction) are formed by the first edge portions 48 and the second edge portions 78. These cutout portions 80 correspond to a second weak portion of the invention, and the portion where these cutout portions 80 are formed corresponds to a portion on the other side in the vehicle width direction of the open section portion of the invention.

Further, portions of the edge portions 54A described above that are on the vehicle rear side are the extending edge portions 82 that extend from the cutout portion 80 side toward the notches 38 side. These extending edge portions 82 may extend in straight lines from the cutout portion 80 side toward the notch 38 side (i.e., may be formed straight along straight lines that connect the cutout portions 80 with the notches 38), or they may be curved.

The opposing wall portions 54 that have the extending edge portions 82 correspond to a load transmitting portion of the invention, and the opposing wall portions 24 and the protruding opposing portions 44 that are fixed to the opposing wall portions 54 correspond to a connecting wall portion that connects the first weak portion with the second weak portion and is formed on the side member. Also, the second edge portions 78 described above extend toward the vehicle front side and the vehicle width direction outside (i.e., the bumper reinforcement 12 side and the other side in the vehicle width direction) from the extending edge portions 82.

Next, the operation and effects of the example embodiment of the invention will be described.

In the vehicle body structure 10 according to the example embodiment of the invention, the notches 38 are formed at portions on the vehicle width direction inside of the closed section portion 34 that is formed on the front side member 14, and the cutout portions 80 are formed at portions on the vehicle width direction outside of the open section portion 74 that is formed by the bumper stay 16 and the protruding portion 42 of the front side member 14. Therefore, as shown in the left drawing in FIG. 3, in the initial stage of a collision when a collision load F is input from the vehicle front side to the bumper reinforcement 12, for example, deformation 90 occurs in the cutout portion 80 formed on the open section portion 74 that is weaker against the collision load F than the closed section portion 34 is.

Also, the opposing wall portions 54 that are fixed to the protruding opposing portions 44 and the opposing wall portions 24 that connect the notches 38 and the cutout portions 80 are formed on the bumper stay 16, and these opposing wall portions 54 are formed having the extending edge portions 82 that extend from the cutout portion 80 side toward the notch 38 side. Therefore, in a stage after the initial stage of a collision described above, the collision load F is transmitted to the extending edge portions 82, such that the deformation 90 that has occurred in the cutout portions 80 described above progresses along the extending edge portions 82 to the notch 38 side. Thus, this deformation 90 spreads to the notches 38. Here, as an example, the deformation 90 creates a protrusion on the vehicle upper side. Also, although not shown, just like the deformation 90 described above, deformation that occurs in the opposing wall portions 24 on the vehicle lower side creates a protrusion on the vehicle lower side.

Figure 3:
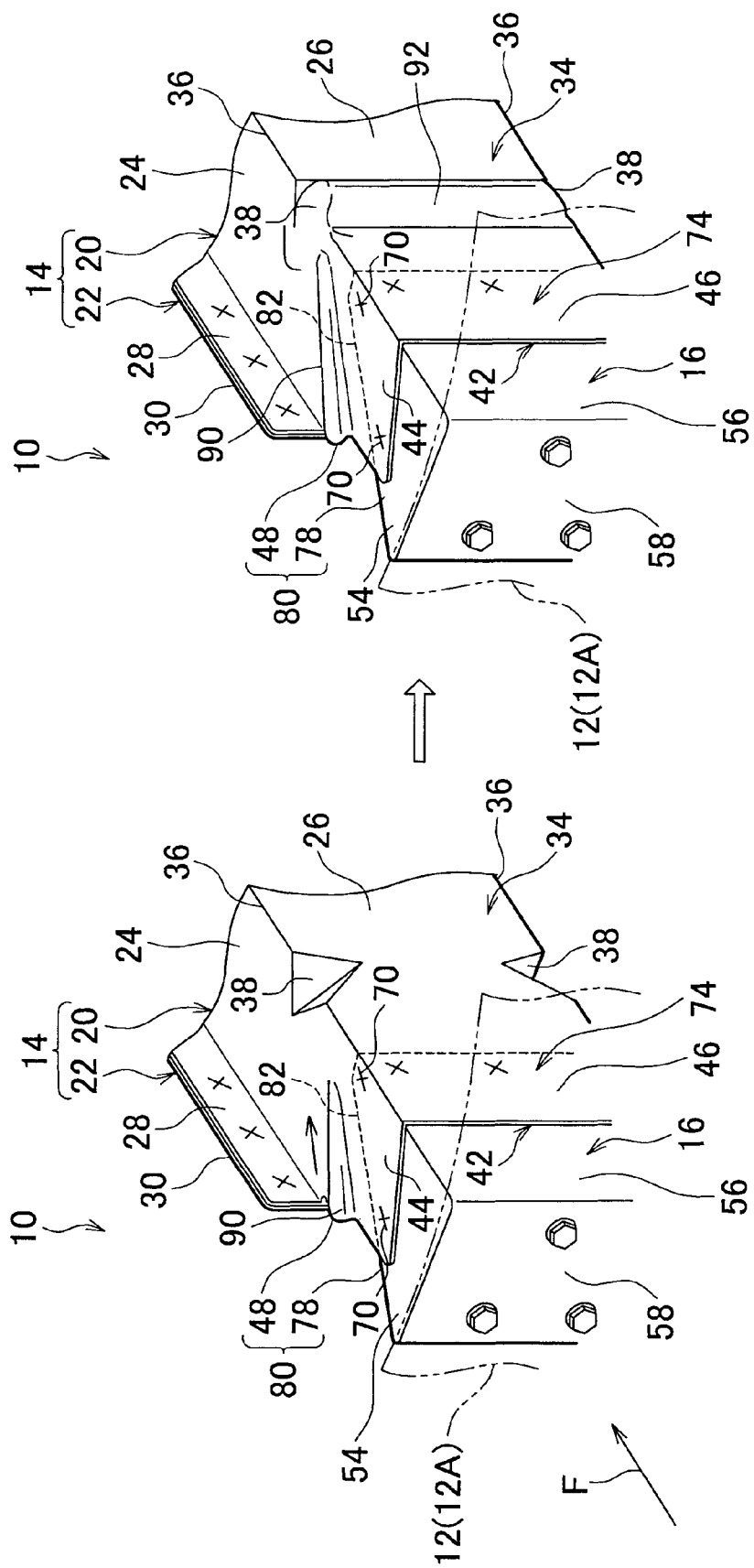
FIG. 3 is a view illustrating a front side member in a compression deformed state after a collision load is input to bumper reinforcement shown in FIG. 1.

Also, when the deformation 90 spreads to the notches 38 in this way, the notches 38 deform, and this deformation of the notches 38 triggers compression deformation in the vehicle longitudinal direction of the front side member 14 at the portion where the notches 38 are positioned, as shown in the right drawing in FIG. 3. Here, as an example, a portion 92 that connects the pair of notches 38 is deformed, creating a protrusion on the vehicle width direction inside. The direction, in which the protrusions are created, of the deformation of the portion 92 that connects these notches 38, and the deformation 90 that spreads from the cutout portions 80 to the notches 38 described above changes depending on the shapes of the cutout portions 80 and the notches 38, and the direction of the collision load F and the like.

In this way, according to this vehicle body structure 10, when the collision load F is input to the bumper reinforcement 12, the front side member 14 compression deforms stably in the vehicle longitudinal direction at the portion where the notches 38 are positioned, so the energy absorption efficiency when the vehicle is involved in a frontal collision can be ensured.

Further, the cutout portions 80 are formed by the first edge portions 48 formed on the protruding portion 42 and the second edge portions 78 formed continuous with the extending edge portions 82 on the bumper stay 16, and these cutout portions 80 form a weak portion that triggers deformation at the initial stage of a collision. Therefore, this weak portion is able to be formed with a simple structure, so the energy absorption efficiency can be efficiently ensured.

Moreover, the notches 38, the cutout portions 80, and the opposing wall portions 54 are formed at portions on both sides in the vehicle vertical direction of the closed section portion 34 and the open section portion 74. Therefore, when the collision load F is input to the bumper reinforcement 12, the front side member 14 can be made to compression deform in a well-balanced manner on both sides in the vehicle vertical direction.

Furthermore, the opposing wall portions 54 are joined to the opposing wall portions 24 and the protruding opposing portions 44 by the plurality of welds 70 lined up along the extending edge portions 82, so in a stage after the initial stage of the collision described above, the collision load F is able to be even more efficiently transmitted to the extending edge portions 82.

Also, after compression deforming in the vehicle longitudinal direction at the portion where the notches 38 are positioned, the front side member 14 further compression deforms in the vehicle longitudinal direction at the portion where the bead 40 (see FIGS. 1 and 2) that is positioned on the vehicle rear side of the notches 38 is positioned. Therefore, the energy absorption efficiency is able to be improved even more.

Next, a modified example of the example embodiment of the invention will be described.

In the example embodiment of the invention described above, the vehicle body structure 10 is applied to the bumper reinforcement 12 that is arranged on a vehicle body front portion, the front side member 14, and the bumper stay 16 that connects these together, but the vehicle body structure 10 may also be applied to a bumper reinforcement that is arranged on a vehicle body rear portion, a rear side member, and a bumper stay that connects these together. In this case, the vehicle body rear portion corresponds to an end portion in a vehicle longitudinal direction of a vehicle body of the invention, and the vehicle front side corresponds to a cabin side of the invention.

Also, the notches 38 are formed at a portion on the vehicle width direction inside of the closed section portion 34, and the cutout portions 80 are formed at a portion in the vehicle width direction outside of the open section portion 74. Alternatively, however, the notches 38 may be formed at a portion on the vehicle width direction outside of the closed section portion 34, and the cutout portions 80 may be formed at a portion in the vehicle width direction inside of the open section portion 74.

Also, the opposing wall portions 54 are joined to the opposing wall portions 24 and the protruding opposing portions 44 by the plurality of welds 70 that are produced by spot welding and lined up along the extending edge portions 82. Aside from this, for example, the opposing wall portions 54 may be joined to the opposing wall portions 24 and the protruding opposing portions 44 by welds produced by laser welding performed along the extending edge portions 82 or the like.

Also, as an example of the first weak portion, the notches 38 are formed on the closed section portion 34. However, as long as it is weak, a bead similar to the bead 40 or the like may also be provided, for example.

Figure 4:
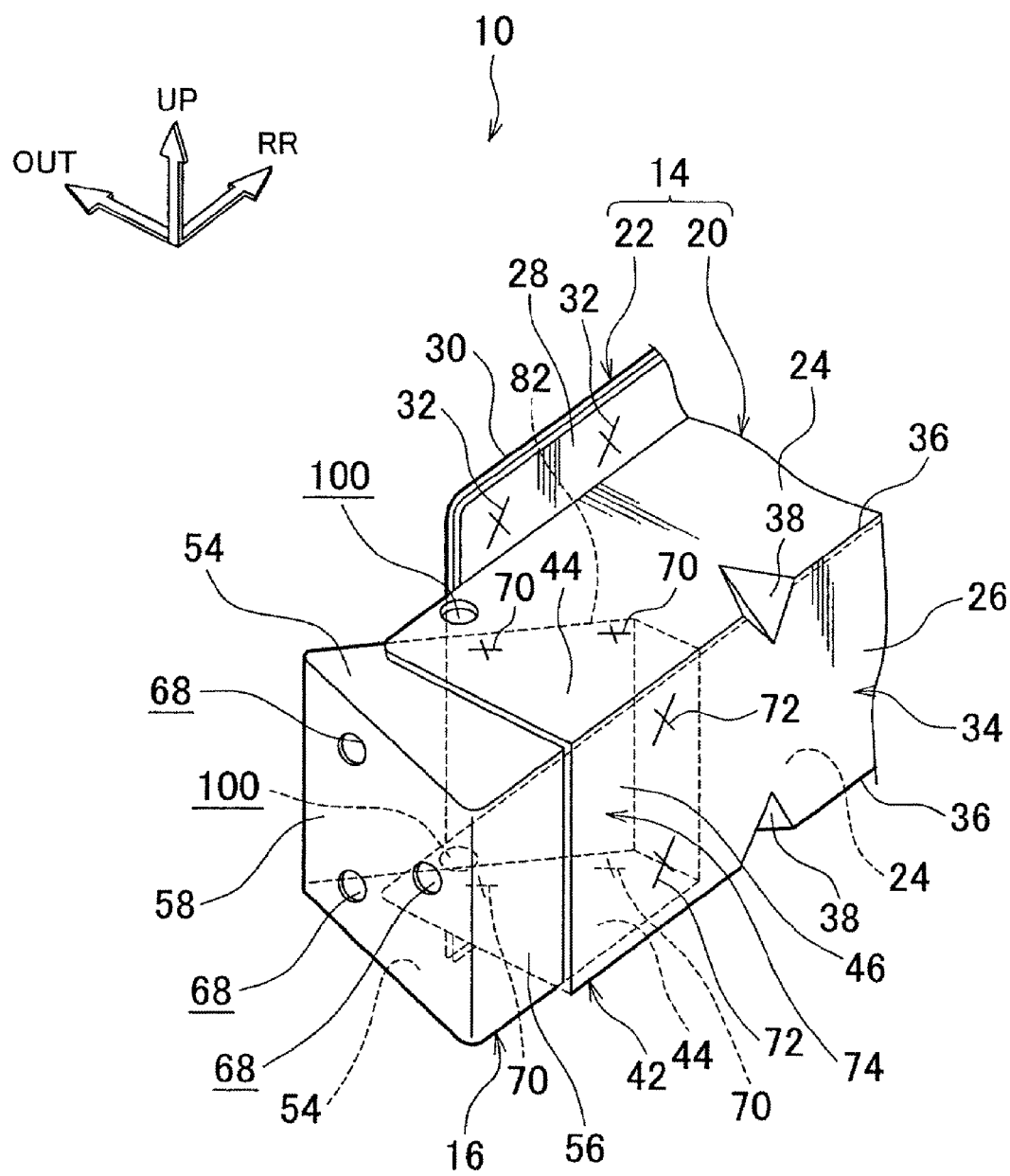
FIG. 4 is a perspective view of a modified example of the vehicle body structure shown in FIG. 1.

Similarly, as an example of the second weak portion, the cutout portions 80 are formed on the open section portion 74. However, as long as it is weak, a through-hole 100 such as that shown in FIG. 4, or the like, may also be formed, for example.

Figure 5:
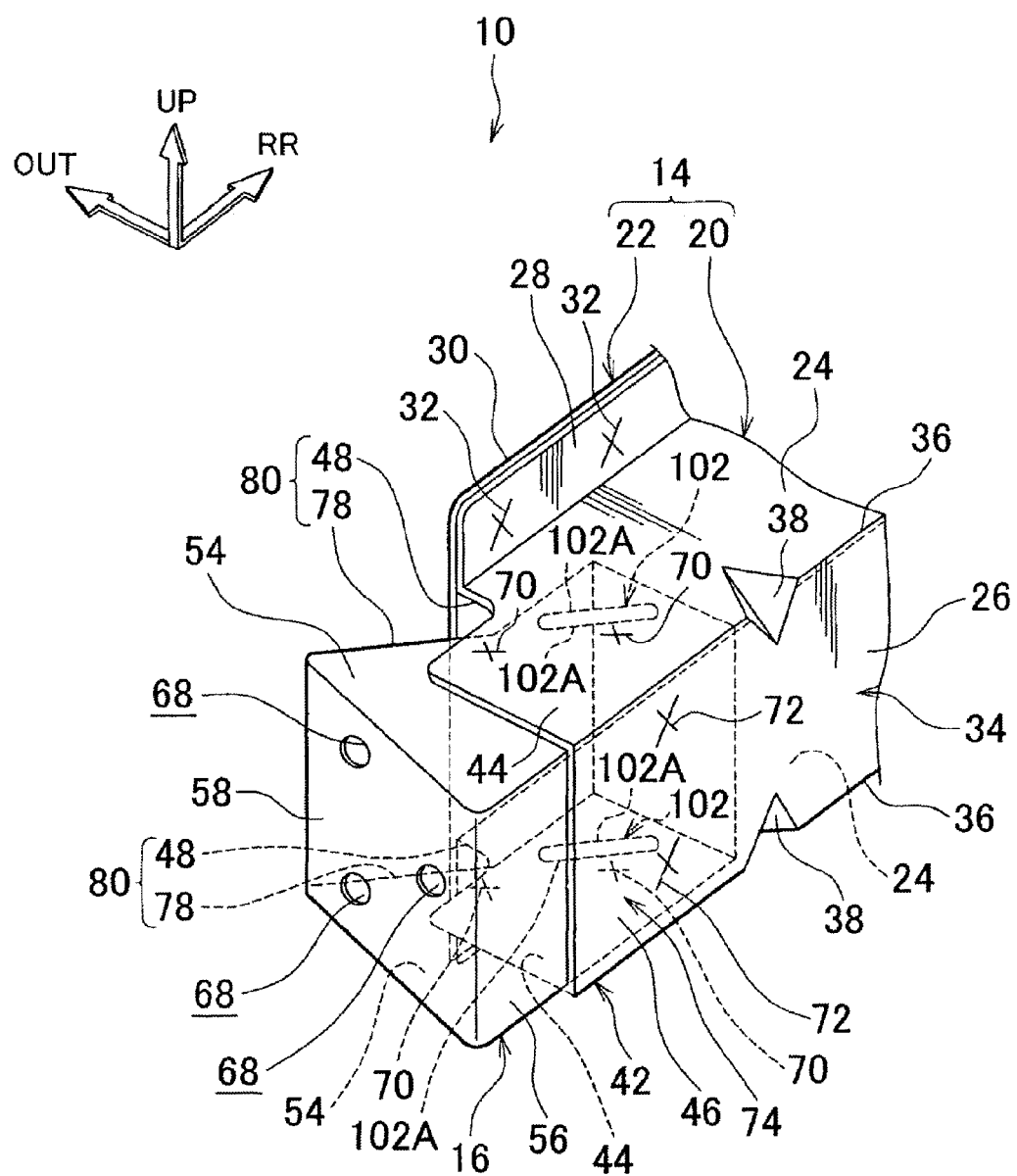
FIG. 5 is a perspective view of another modified example of the vehicle body structure shown in FIG. 1.

Also, as shown in FIG. 5, the opposing wall portions 54 and the inside wall portion 56 of the bumper stay 16 may extend to the vehicle rear side, and a bead 102 that extends from the cutout portion 80 side toward the notch 38 side may be formed, and edge portions 102A (i.e., ridge line portions) on both sides in the width direction of this bead 102 may correspond to an extending edge portion of the invention.

Also, in the example embodiment (see FIG. 1) of the invention described above, when the energy absorption efficiency is able to be ensured, for example, the bead 40 formed on the vehicle rear side of the notches 38 may be omitted.

While the invention has been described with reference to example embodiments thereof, it should be understood that the invention is not limited to the example embodiments. That is, the invention may of course be carried out in modes that have been modified or improved in any of a variety of ways without departing from the scope thereof.

The invention claimed is:
1. A vehicle body structure comprising:
a bumper reinforcement that is arranged on an end portion of a vehicle body in a vehicle longitudinal direction so that a longitudinal direction of the bumper reinforcement is set along a vehicle width direction;
a side member that is arranged on a vehicle longitudinal direction cabin side with respect to the bumper reinforcement so that a longitudinal direction of the side member is set along the vehicle longitudinal direction, and that is formed with
  i) a closed section portion of which a cross section when the closed section portion is cut along the vehicle width direction forms a closed section, the closed section portion being formed by a pair of side member opposing wall portions extending in the vehicle width direction and the vehicle longitudinal direction and oppose one another in a vehicle vertical direction, a side member inside wall portion connecting end portions of the side member opposing wall portions at an inside side in the vehicle width direction, and a side member outer extending in the vehicle vertical direction and the vehicle longitudinal direction, and
  ii) a protruding portion that protrudes from the closed section portion toward the bumper reinforcement side, the protruding portion being formed by a pair of protruding opposing portions that are formed continuous with the side member opposing wall portions and face each other, and a protruding connecting portion that is formed continuous with the side member inside wall portion and connects end portions of the protruding opposing portions at the inside side in the vehicle width direction;
a bumper stay that connects the side member to the bumper reinforcement, the bumper stay including a pair of bumper stay opposing wall portions extending in the vehicle width direction and the vehicle longitudinal direction and oppose one another in the vehicle vertical direction, a bumper stay inside wall portion connecting end portions of the bumper stay opposing wall portions at the inside side in the vehicle width direction, and a bumper stay front wall portion connecting end portions of the bumper stay opposing wall portions and the bumper stay inside wall portion at a vehicle front side thereof;

a first weak portion formed on the inside side in the vehicle width direction of the side member; and a second weak portion formed on an outside side in the vehicle width direction of the side member, wherein a vehicle rear side portion of the bumper stay is inserted inside the side member, the bumper stay opposing wall portions are joined to the side member opposing wall portions and the protruding opposing portions, and the bumper stay inside wall portion is joined to the side member inside wall portion, and wherein, in the vehicle width direction, a width of the bumper stay opposing wall portions is greater at the vehicle front side thereof than at a vehicle rear side thereof.

2. The vehicle body structure according to claim 1, wherein a first edge portion is formed on the protruding portion, the first edge portion extends toward the bumper reinforcement side and the inside side in the vehicle width direction;

a second edge portion is formed on the bumper stay, the second edge portion is positioned on the bumper reinforcement side of the first edge portion, extends from the extending edge portion toward the bumper reinforcement side and the outside side in the vehicle width direction, and intersects with the first edge portion in a plan view; and the second weak portion is a cutout portion that is formed by the first edge portion and the second edge portion, and that is open to the outside side in the vehicle width direction.

3. The vehicle body structure according to claim 1, wherein the first weak portion is formed at each end of the closed section portion in the vehicle vertical direction.

4. The vehicle body structure according to claim 1, wherein a concave portion that extends in the vehicle vertical direction and that is indented toward the outside side in the vehicle width direction is formed in the side member on the inside side in the vehicle width direction of the closed section portion.

5. The vehicle body structure according to claim 1, wherein the bumper stay opposing wall portions are joined to the side member opposing wall portions and the protruding opposing portions by a plurality of welds lined up along the section of the edge portions of the bumper stay opposing wall portions extending between the first weak portion and the second weak portion.

* * * * *